June 26, 1923.

O. WORTMAN 1,460,190

SYSTEM OF CONTROL

Filed Sept. 23, 1921

WITNESSES:
L.F.Sonnemann.
H.C.Lowe

INVENTOR
Otto Wortman
BY
Wesley F. Carr
ATTORNEY

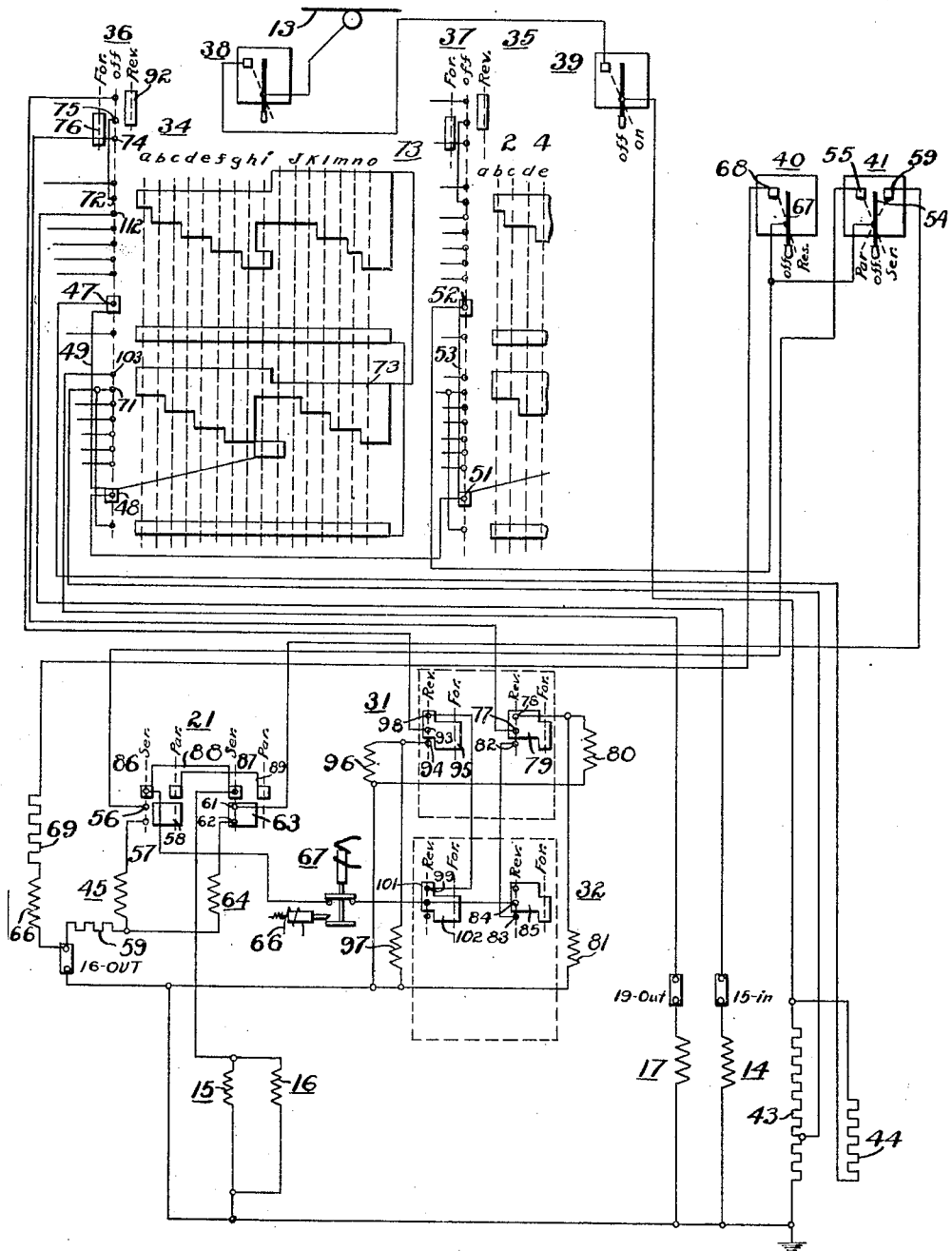

Patented June 26, 1923.

1,460,190

UNITED STATES PATENT OFFICE.

OTTO WORTMAN, OF AUDUBON, NEW JERSEY, ASSIGNOR TO WESTINGHOUSE ELECTRIC & MANUFACTURING COMPANY, A CORPORATION OF PENNSYLVANIA.

SYSTEM OF CONTROL.

Application filed September 23, 1921. Serial No. 502,594.

*To all whom it may concern:*

Be it known that I, OTTO WORTMAN, a citizen of the United States, and a resident of Audubon, in the county of Camden and State of New Jersey, have invented a new and useful Improvement in Systems of Control, of which the following is a specification.

My invention relates to motor-control systems and it has particular relation to control systems for governing the operation of a plurality of motors that drive a railway vehicle.

One object of my invention is to provide a control system that shall be relatively simple and economical in construction and positive and reliable in operation.

Another object of my invention is to provide a control system having a plurality of controllers that shall be so arranged that it will be impossible to operate the motors when any of the controllers occupy an incorrect position with respect to the other controllers.

Briefly speaking, my invention consists in providing certain interlocks upon a plurality of main reversers and a changeover switch, whereby energization of the actuating coil of the line switch or circuit-breaker is prevented, if the main reversers and the changeover switch occupy improper positions. An interlock is also provided to prevent actuation of the changeover switch during energization of the motors.

For a better understanding of my invention, reference may be made to the accompanying drawings, Figure 1 of which is a diagrammatic view of the main circuits of a control system embodying my invention;

Fig. 3 is a diagrammatic view of the auxiliary circuits that govern the energization of the actuating coils of the contactors shown in Fig. 1.

Figures 1, 2, 4:
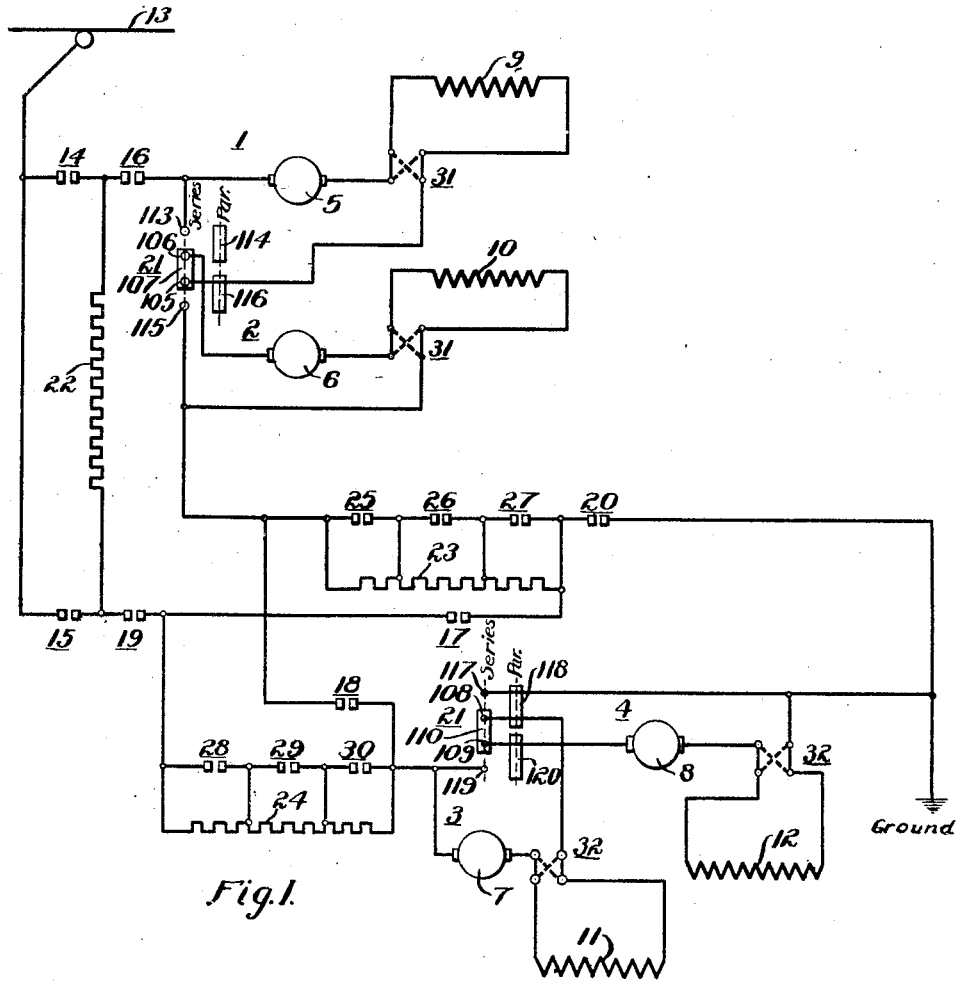
Fig. 2 is a sequence chart showing the order of closure of the switches or contactors that are illustrated in Fig. 1.
Fig. 4 is a diagrammatic view of one of the contactors or switches employed in the control system illustrated in Fig. 1.

Referring particularly to Fig. 1, a plurality of motors 1 to 4, inclusive, respectively having armatures 5 to 8 and corresponding field-magnet windings 9 to 12, are energized from a suitable source of energy, such as the trolley-conductor 13 and a return circuit marked "Ground."

A plurality of line switches 14 and 15 and control switches 16 to 20, inclusive, are employed for successively connecting the motors 1 to 4, inclusive, in series and in series-parallel relation or in series-parallel and parallel relation, in accordance with the position occupied by a series-parallel or changeover switch 21.

The changeover switch 21 is provided with a series position for connecting the motors 1 and 2 in series relation one with the other and for connecting the motors 3 and 4 in corresponding relation. The changeover switch 21 is further provided with a parallel position for connecting the motors 1 and 2 in parallel relation and the motors 3 and 4 in parallel relation the one with the other.

A plurality of starting resistors 22, 23 and 24 are employed for governing the current traversing the motors 1 to 4, inclusive, during the acceleration thereof. A plurality of accelerating contactors 25, 26 and 27 are employed for shunting the starting resistor 23 and a plurality of contactors 28, 29 and 30 are correspondingly employed to shunt portions of the starting resistor 24.

A main reverser 31 is employed to change the relation of the series field-magnet windings 9 and 10 of the motors 1 and 2, respectively, to their corresponding armatures 5 and 6 to secure reverse operation of the motors 1 and 2. Another main reverser 32 is employed for changing the relation of the series field-magnet windings 11 and 12 of the motors 3 and 4, respectively, to the corresponding armatures 7 and 8, to secure reverse operation of the motors 3 and 4.

Referring particularly to Fig. 3 of the drawing, a plurality of speed controllers 34 and 35 are respectively mounted at the opposite ends of the car or railway vehicle to be driven. Each of the controllers 34 and 35 have an "off" position and a plurality of operating positions *a* to *o* inclusive. For the sake of clearness, only a portion of the controller 35 has been illustrated. A plurality of master reversers 36 and 37 are respectively mounted at the opposite ends of the car. Each of the master reversers 36 and 37 is provided with an "off" position, a forward position and a reverse position.

A plurality of canopy switches 38 and 39 are respectively mounted at the opposite ends of the car. A plurality of reset switches 40 and master series-parallel switches 41 are preferably mounted upon both ends of the car, but only those located at one end of the car are illustrated.

The reset switch 40 has an "off" position and an "on" position. It is normally biased to its "off" position by means of a resilient member (not illustrated).

The master series-parallel switch 41 has an "off," a parallel and a series position. The switch 41 is normally biased to its "off" position. The reset switches 40 at the two ends of the car are connected in parallel relation and the master series parallel switches 41 at the two ends of the car are likewise connected in parallel relation.

The operation of the control system is begun by actuating the canopy switches 38 and 39 to their "on" position, thereby establishing an auxiliary circuit from the trolley-wire 13 through the canopy switches 38 and 39 and auxiliary control resistor 43 to Ground.

Energization of the actuating coils of the remaining switches is effected by taps from the auxiliary control resistors 43 and 44. The master series-parallel switch 41 is actuated from its "off" to either its series or parallel position, depending upon whether the trolley-wire 13 is energized by relatively high or low voltage, such, for example, as circuits of 1200 and 600 volts, which are frequently employed for the operation of interurban railway vehicles.

If the master series-parallel switch 41 is actuated to its series position, series coil 45 of the change over switch 21 is energized, provided that both the speed controllers 34 and 35 are in their "off" position, by a circuit that is established from the trolley-wire 13 through the canopy switches 38 and 39, auxiliary resistor 44, control fingers 47 and 48 of the speed controller 34, which are bridged by contact segment 49 only when controller 34 is in its "off" position, control fingers 51 and 52, which are bridged by contact segment 53 of speed controller 35 when it is in the "off" position, contact arm 54 and stationary contact member 55 of the master series-parallel switch 44, control fingers 56 and 57, which are bridged by contact segment 58 of the changeover switch 21 when the changeover switch 21 is in its parallel position, series actuating coil 45, auxiliary control resistor 59 and interlock 16-out to Ground.

When the series coil 45 of the changeover switch 21 is energized, an electrical device of which the coil 45 constitutes a portion actuates the controller 21 to its series position. When the changeover switch 21 occupies its series position, the control fingers 56 and 57 are no longer engaged by the contact segment 58 and the series coil 45 is de-energized.

If the operator desires to bring the changeover switch 21 to its parallel position the master changeover switch 41 is actuated to its parallel position, to establish a circuit from the trolley-wire 13 through canopy switches 38 and 39, control resistor 44, control fingers 47 and 48 of the speed controller 34, which are bridged by contact segment 49, control fingers 51 and 52, which are bridged by contact segment 53 of the speed controller 35, movable arm 54 and contact segment 59 of the master changeover switch 41, control fingers 61 and 62 of the main changeover switch 21, which are bridged by contact segment 63, parallel actuating coil 64, auxiliary control resistor 59 and interlock 16-out to Ground.

The parallel actuating coil 64 constitutes a portion of the electrical device that is also governed by the series actuating coil 45.

When the changeover switch 21 has been actuated from its series to its parallel position, the control fingers 61 and 62 are no longer engaged by contact segment 63 of the changeover switch 31, and the parallel coil 64 is de-energized.

From the above description of the control circuits for governing the main changeover switch 21, it is apparent that neither the series coil 45 nor the parallel actuating coil 64 thereof may be energized, unless both of the speed controllers 34 and 35 occupy their "off" positions. Once the contactor 16 has closed, the closure of which is effected upon either of the speed controllers 34 and 35 occupying its first operating position, the interlock 16-out prevents either of the actuating coils 45 or 64, which govern the actuation of the changeover switch 21, from becoming energized. This arrangement of circuits prevents the changeover switch 21 from being operated at a time when incorrect circuits might be established by its movement to another position.

A reset coil 66 is provided for the overload relay 67, which governs the energization of the actuating coil of the line switch 15. The reset coil 66 can be energized only when both speed controllers 34 and 35 occupy their "off" positions and the reset switch 40 occupies its "on" position. Under these conditions, a circuit for the reset coil 66 is established from the trolley-wire 13 through canopy switches 38 and 39, control resistor 44, control fingers 47 and 48, which are bridged by contact segment 49 of the speed controller 34 and control fingers 51 and 52, which are bridged by contact segment 53 of the speed controller 35, reset arm 67 and stationary contact member 68 of the reset switch 40, auxiliary resistor 69, reset coil 66 and interlock 16-out to Ground. Thus, the reset coil 66 can not be energized, if the switch 16 occupies its closed position.

When the changeover switch 21 occupies the desired series or parallel position, the next operating step is to actuate either the master reverser 36 or the master reverser 37 to its forward or reverse position, in accordance with the direction of operation desired. If the master reverser 36 is actuated to its forward position, then upon the speed controller 34 being actuated to its first position, a circuit is established from trolley-wire 13 through canopy switches 38 and 39, control resistor 43, control fingers 71 and 72 of the speed controller 34, which are bridged by contact segment 73, control fingers 74 and 75 of the master reverser 36, which are bridged by contact segment 76, control fingers 77 and 78, which are bridged by contact segment 79 of the main reverser 31 and parallel-connected "forward" actuating coils 80 and 81 of the main reversers 31 and 32, respectively, to Ground.

When the main reverser 31 occupies its forward position, the control finger 78 is no longer engaged by the contact segment 79, whereby the "forward" actuating coils 80 and 81 are de-energized.

When the main reversers 31 and 32 occupy their forward position, a circuit is established from the positively energized control finger 77 through contact segment 79 and control finger 82 of the main reverser 31, control fingers 83 and 84 of the main reverser 32, which are bridged by contact segment 85, contact members of the overload relay 67, control fingers 86 and 87 of the changeover switch 21 which are bridged by contact segment 88, and parallel-connected actuating coils of the switches 15 and 16 to Ground.

If the changeover switch 21 does not fully occupy either its series or its parallel position, control fingers 86 and 87 will not be bridged by the one or the other of contact segments 88 and 89. This arrangement of contacts prevents closure of the line switch 15, if the changeover switch 21 does not occupy its proper position.

If the main reversers 31 and 32 do not both occupy their forward position, the circuit between the contact segments 79 and 85 of the main reversers 31 and 32, respectively, will not be electrically connected by a circuit comprising the control fingers 82 and 83. This arrangement of interlocks prevents the line switch 15 from being energized, if either of the main reversers 31 or 32 does not occupy its forward position, when the master reverser 36 occupies its forward position.

If the operator desires to drive the vehicle in a reverse direction, he will actuate the master controller 36 to its reverse position, thereby establishing a circuit from the trolley-wire 13 through the canopy switches 38 and 39, control resistor 43, control fingers 71 and 72, which are bridged by contact segment 73 of the speed controller 34, control fingers 74 and 91 of the master reverser 36, which are bridged by contact segment 92, control fingers 93 and 94, which are bridged by contact segment 95 of the main reverser 31, and parallel-connected reverse actuating coils 96 and 97 of the main reversers 31 and 32, respectively, to Ground.

Upon the main reversers 31 and 32 occupying their reverse positions, a circuit is established from the positively-energized contact segment 95 of the main reverser 31 through control finger 98 thereof, control fingers 99 and 101 which are bridged by contact segment 102 of the main reverser 32, contact members of the overload relay 67, control fingers 86 and 87 of the changeover switch 21—which are bridged by either contact segment 88 or 89, depending upon whether the changeover switch 21 occupies its series or parallel position—and the parallel-connected coils of the switches 15 and 16 to Ground.

Upon the speed controller 34 being actuated to position a, another auxiliary circuit is established from the positively-energized control finger 71 of the speed controller 34 through contact segment 73, control finger 103, interlock 19-out and the actuating coil of the series switch 17 to Ground.

When the switches 15, 16 and 17 are closed, a main circuit is established from the trolley-wire 13 through line switch 15, starting resistor 22, switch 16, armature 5 of the motor 1, main reverser 31, series field-magnet winding 9 of the motor 1, control fingers 105 and 106 which are bridged by contact segment 107 of the changeover switch 21, if the changeover switch 21 occupies its series position, armature 6 of the motor 2, main reverser 31, series field-magnet winding 10 of the motor 2, starting resistor 23, series contactor 17, starting resistor 24, armature 7 of the motor 3, main reverser 32, series field-magnet winding 11, control fingers 108 and 109, which are bridged by contact segment 110 of changeover switch 21, armature 8 of the motor 4, main reverser 32 and series field-magnet winding 12 of the motor 4 to Ground.

When the speed controller 34 occupies its position b, a circuit is established from the positively-energized contact segment 73 thereof through control finger 112, interlock 15-in and the actuating coil of the line switch or circuit-breaker 14 to Ground.

The starting resistor 22 is shunted by the closure of the line switch 14. As the main circuits of the control system are well understood in the art, it is considered unnecessary to describe the acceleration of the motors 1 to 4, inclusive, further than to say that after the resistors 23 and 24 have been shunted by the closure of the contactors 25 to 30, inclusive, in accordance with the steps $c$ to $i$ of the sequence chart, the motors 1 and 2 are connected in parallel relation to the motors 3 and 4 by means of the closing of parallel-connecting contactors 19 and 20 and the opening of series contactor 17. The contactor 18 is employed during a portion of the transition period to shunt the starting resistors 23 and 24.

After the motors 1 to 4, inclusive, are connected in parallel groups, the starting resistors 23 and 24 are again shunted in accordance with steps $k$ to $o$ of the sequence chart.

If the changeover switch 21 occupies its parallel position, the motors 1 and 2 are connected in parallel relation by the control fingers 106 and 113 being bridged by contact segment 114 and control fingers 105 and 115 being bridged by contact segment 116 of the changeover switch 21.

The motors 3 and 4 are also connected in parallel relation by control fingers 108 and 117 being bridged by contact segments 118 and the control fingers 109 and 119 being bridged by contact segment 120 of the changeover switch 21.

When the motors 1 and 2 and the motors 3 and 4 are connected in parallel relation, the closure of the contactors that are illustrated in Fig. 1 is effected in the same order as when the changeover switch 21 occupies its series position. In other words, the closure of the contactors shown in Fig. 1 occurs in accordance with the sequence chart of Fig. 2 regardless of whether the changeover switch 21 occupies its series or its parallel position.

From the above description, it is apparent that I have provided a control system that prevents the closure of a line switch unless both main reversers occupy corresponding forward or reverse positions and the changeover switch fully occupies either its series or its parallel position. It is also impossible to actuate the changeover switch so long as the motors are energized.

While I have shown my invention in the preferred form, it is apparent that minor modifications may be made in the arrangement of circuits and apparatus without departing from the spirit of my invention. I desire, therefore, to be limited only by the scope of the appended claims.

I claim as my invention:

1. In a control system, the combination with a plurality of motors, of a plurality of main controllers for reversing said motors, each of said controllers having a forward and a reverse position, a changeover switch having a plurality of positions for connecting said motors in different relations, a line switch, a master controller for governing said switch and a plurality of interlocks controlled by said reversing controllers and said changeover switch for preventing the closure of said line switch upon any of said reversing controllers or said changeover switch occupying incorrect positions.

2. In a control system, the combination with a plurality of dynamo-electric machines and a switching device having a plurality of positions for connecting said machines in different relations, of a plurality of controllers for governing the energization of said machines, each of said controllers having a plurality of positions, and means for actuating said device, said means being operative only upon said controllers occupying corresponding positions.

3. In a control system, the combination with a plurality of dynamo-electric machines and a changeover switch, of a plurality of controllers for governing said machines, each of said controllers having an "off" position, of means for actuating said changeover switch and means for rendering said actuating means inoperative upon either of said controllers being out of its "off" position.

4. In a control system, the combination with a plurality of motors, and a changeover switch having a plurality of positions for connecting said motors in different relations, of a plurality of controllers having a plurality of positions for governing the energization of said motors, an electrical device for effecting the actuation of said changeover switch, means for energizing said device, and means governed by said controllers for rendering said energizing means operative only upon said controllers occupying their "off" positions.

5. In a control system, the combination with a plurality of dynamo-electric machines and a changeover switch having a plurality of positions for connecting said machines in different relations, of means comprising a plurality of coils for actuating said switch, a master switch for governing the energization of said coils and a controller for governing the energization of said machines and means for preventing the energization of said coils unless said motors are de-energized.

6. In a control system, the combination with a plurality of motors, of a plurality of controllers for governing the energization of said motors, a changeover switch for connecting said motors in different relations, a switching device for actuating said changeover switch, means comprising a circuit for energizing said device, and means for interrupting said circuit upon any one of said controllers being out of its "off" position or upon said motors being energized.

In testimony whereof, I have hereunto subscribed my name this thirteenth day of September, 1921.

OTTO WORTMAN.